Sept. 30, 1952        J. G. MILES        2,612,626
VACUUM TUBE CHARACTERISTIC TRACER
Filed April 19, 1946        2 SHEETS—SHEET 1
FIG. 1
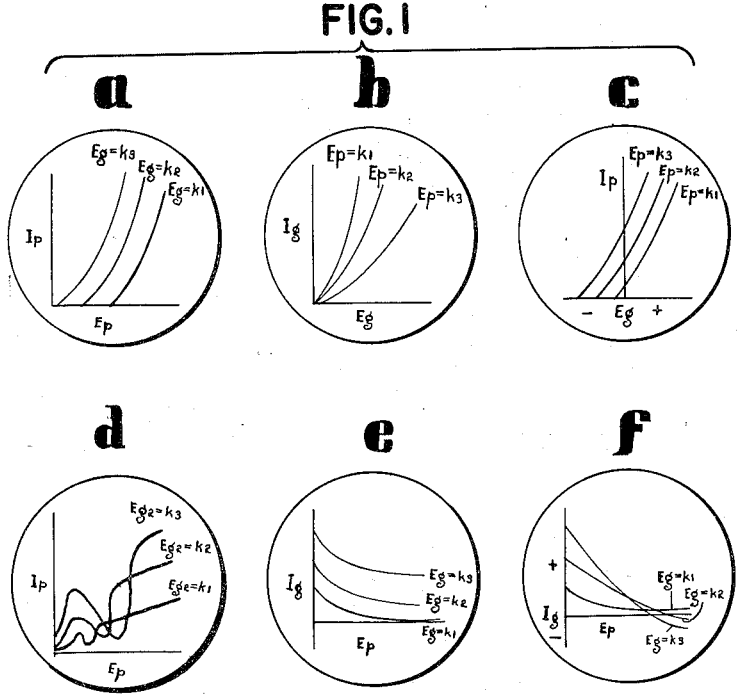
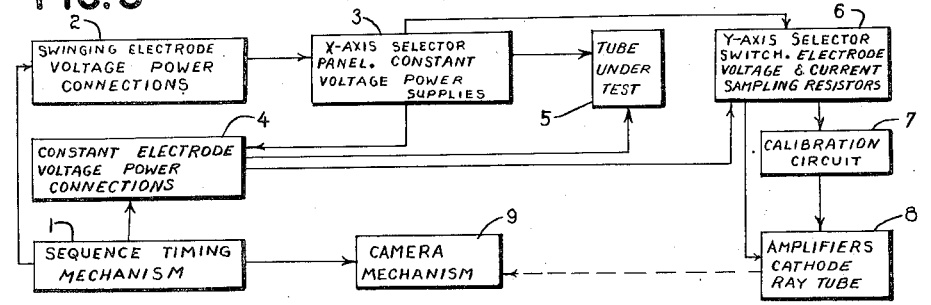
FIG. 3
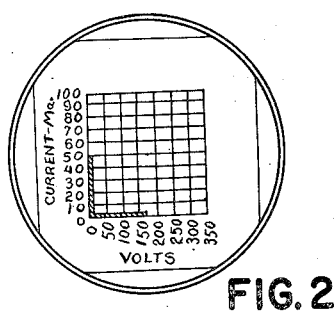
FIG. 2
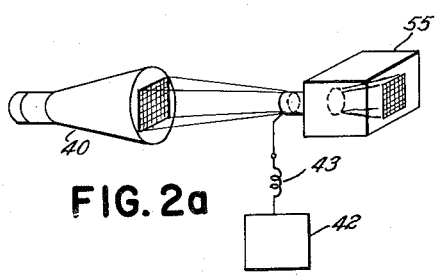
FIG. 2a
INVENTOR
James G. Miles
BY *Lawrence Barns*
ATTORNEY Patented Sept. 30, 1952

2,612,626

UNITED STATES PATENT OFFICE 2,612,626

VACUUM TUBE CHARACTERISTIC TRACER

James G. Miles, Sidney, N. Y.

Application April 19, 1946, Serial No. 663,425

8 Claims. (Cl. 315—370)

This invention relates to apparatus for ascertaining the characteristic curves of vacuum tubes and the like, particularly to apparatus for providing a photographic record of such characteristics, for example, by producing a trace of such a characteristic on the screen of a cathode ray tube or the like, and photographing said trace, and to methods of recording such traces.

The tube whose characteristic is to be ascertained may be connected to a power source supplying fixed direct current voltages to those electrodes whose direct potential is to be kept constant for the characteristic desired, and supplying a variable or "swinging" voltage to the electrode whose potential is to be varied. This variable voltage may cause a variable current in the same electrode circuit or in another, which current may be measured, for example, by measuring the voltage across a suitable resistor in the desired circuit. If the voltage across such a resistor is applied to one pair of deflecting plates (for example, the vertical) in a cathode ray tube, and a voltage which accurately represents the variable voltage supply is applied to another pair at right angles to the first pair, the spot representing the test characteristic will move across the screen in the direction for example, of the X-axis, an amount dependent on the instantaneous value of the variable voltage supplied to the vacuum tube electrode, and will move transversely, for example in the direction of the Y-axis, an amount dependent on the drop across the sampling resistor, that is an amount dependent on the current in the electrode circuit containing said resistor. Thus the movement of the spot on the cathode ray screen will represent the characteristic of the tube. If the variable voltage is supplied to the grid, and the current-sampling resistor is in the plate circuit, a grid-plate transfer characteristic will be obtained. The curve on the cathode ray screen may be photographed to give a record of the characteristic.

It is an object of my invention to facilitate the obtaining of such records, by providing apparatus conveniently adjustable to produce a variety of tube characteristics accurately on such a screen, and to enable the photographing to be done accurately and quickly. It is a further object to provide such curves with a cross-lines background showing the proper axes, and to enable the proper calibration to insure accuracy of positioning and cross-lining of said background.

The proper background is obtained by use of a calibrated mask with slots along the X and Y axes to facilitate lining it up with the actual axes of the cathode ray screen. The calibration is obtained by apparatus for putting an accurately-known series of fixed voltages on the cathode ray plates, so the number of volts per inch may be determined.

The fixed voltages are obtained from a regulated direct current power supply, and the variable voltage by superimposing an alternating voltage on the direct voltage, for example by a transformer. A similarly variable voltage from the same source is applied to one pair of cathode ray deflecting plates to provide the X or voltage axis, for example. Direct current amplifiers may be interposed in the circuit feeding each pair of deflection plates.

My invention uses a sequence switch to time the various operations in photographing the curves. Any form of such switch which will make the connection in proper sequence may be used. I prefer to use a switch with sufficient contacts to disconnect the general illumination before actuating the camera shutter, and to apply the vacuum tube voltages while the shutter is open. A power relay may be used between the sequence switch and the power circuits.

Other objects, advantages and features of the invention will be apparent from the following specification taken with the accompanying drawings, in which:

Fig. 1, (a) to (f) shows some of the various forms of vacuum tube characteristic curves which can be obtained with my invention, these being respectively triode plate, triode grid, triode grid-plate transfer, tetrode plate with screen modulator, triode plate-grid transfer showing no grid emission, and triode plate-grid transfer showing grid emission.

Fig. 2 shows a cathode-ray screen with a typical mask which may be used according to the invention.

Fig. 2a shows a perspective view of the cathode ray tube and mask of Fig. 2 in focus before a camera fitted with a tripping device all according to the invention.

Fig. 3 shows a block diagram of an apparatus in accordance with the invention.

Figure 4:
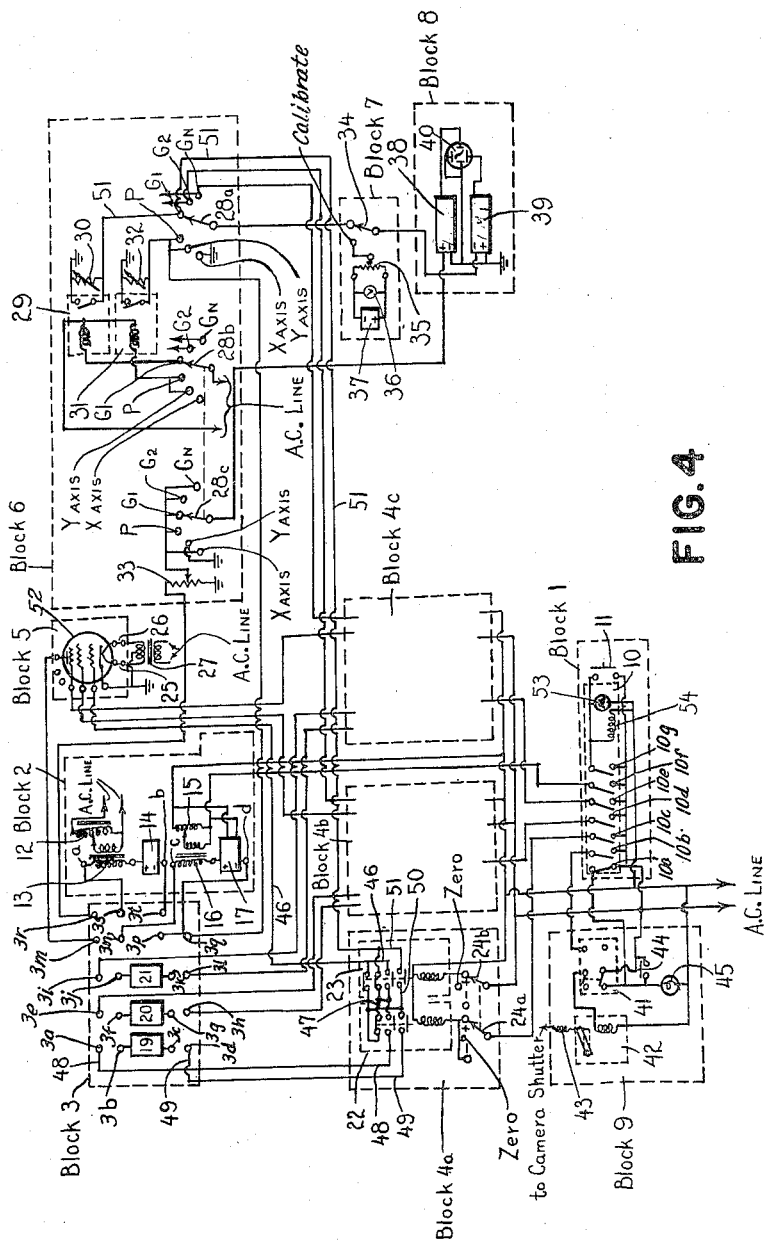
Fig. 4 shows a circuit diagram according to the invention, showing some of the features in more detail.

In Figs. 3 and 4, the tube 52 whose characteristics are to be traced is inserted in the socket of block 5, the desired characteristic appearing on the screen of the cathode ray tube 40 in block 8.

Block 1 includes a timer 10 operated by push-button 11. Closing of the push-button 11 completes the circuit to the shunt motor having an armature 53 and a shunt field 54, which rotates a cam (not shown) for opening and closing contacts 10a, b, c, d, e, f, g, in block 1. Contacts 10a are normally closed and connected to a lamp 45 in block 9, which serves to illuminate the room in which the apparatus is located. A switch 44 is shown for operating lamp 45 independently of the timer 10 when desired. The switching contacts 10c, d, e, f, should be arranged to close simultaneously or in rapid sequence. Contact 10b closes to trip relay 42, which operates the camera shutter (not shown). Contact 10g should be arranged to open after the operation of the shutter, to return timer 10 to its original position. Block 1 controls the operation of blocks 2, 4 and 9.

Block 2 shows the necessary circuits to swing the voltage of desired tube elements(s); said voltage to be swung or rapidly varied over a range of values as the independent variable. Two circuits are shown; one high power and one low power. To swing the plate of a transmitting tube, an A. C. wave is superimposed on D. C. by use of transformer 16 in series with D. C. plate supply 17. The magnitude of the A. C. wave is controlled by means of auto-transformer 15. If the power requirements are heavy, intermediate relays can be used in order to protect relay contacts 10f. Components 16 and 17 are switched simultaneously.

In some situations with particularly high plate power requirements (transmitting tubes) it is best to maintain constant grid voltages and to use the plate as the independent voltage variable. The D. C. plate supply need not then be regulated, that is, provided with a voltage stabilizing circuit and cost of constructing the D. C. supply is cut to a minimum.

For low values of plate voltage (transmitting tubes and receiving tubes), however, one of the D. C. supplies 19, 20 or 21 of block 3 may be used with suitable jumpers or terminal board connectors if desired to maintain constant plate voltage while swinging another tube element. At this time, the grid is swung by means of transformer 13 in series with D. C. supply 14; the A. C. voltage is controlled by means of autotransformer 12. Components 13 and 14 are specially chosen for low impedance and low phase shift so that the resulting characteristic displayed on the cathode ray tube will truly be that of the device under test and will not reflect extraneous impedances of the D. C. and A. C. power supplies. They are used whenever possible in preference to the high power units 16 and 17.

Block 3 is the X axis panel, in which connections are made by any convenient manner according to the requirements. Examples: To swing the plate of a transmitting tube, connections are made as follows: 3a to 3b, 3c to 3d, 3e to 3f, 3g to 3h, 3i to 3j, 3k to 3l, 3m to 3n to 3r, 3p to 3q. To swing the control grid, connections are made as follows: 3a to 3r to 3s, 3b to 3m, 3c to 3q, 3d to 3t, 3e to 3f, 3g to 3h, 3i to 3j, and 3k to 3l. The swing $E_{g2}$, connections are made as follows: 3a to 3b, 3c to 3d, 3e to 3r to 3s, 3f to 3m, 3g to 3q, 3h to 3t, 3i to 3j and 3k to 3l. Similarly, other connections may be made. For convenience, I recommend the use of preconnected plugs to fit into terminals of block 3. Parts 19, 20 and 21 of block 3 are any suitable D. C. supplies.

Block 4 contains the switching mechanism for the D. C. power supplies. It has a number of sections herein designated as 4a, 4b, 4c, etc. Each of these blocks contains a switching system for one electrode on which the voltage is maintained constant. Switch 22 connects and disconnects the power supply for the particular electrode according to the signal received from the control unit (block 1). Swith 22 includes a shorting mechanism which grounds the electrode, through its electrode current sampling resistor, whenever electrode voltage is zero. Incorporated into the switching mechanism is a reversing switch shown as part 23.

Switch sections 24a and 24b are ganged for adjustment to positions designated "plus," "minus," or "zero"; 24a is connected to excite relay 22, in either the "plus" or "minus" position, at time periods signaled by switch section 10c. In the position shown, switch 22 includes one closed bridging contact between the top pair of terminals and two open bridging contacts between the two other pairs of contacts. Similarly in the position shown, switch 23 includes two closed bridging contacts above two open bridging contacts. In the plus position of switch 24, switches 22 and 23 are energized, and the grid is connected to the positive side of the D. C. supply 19. Negative is connected through electrode current sampling resistor 30 to ground. The circuit from the control grid is as follows: 46, 47, 48, 3a, 3b, 3c, 3d, 49, 50, 51, 30, ground. In the minus position of switch 24, switch 22 is energized, switch 23 is deenergized, and the grid is connected to negative side of the D. C. supply 19; positive is connected through electrode current sampling resistor 30 to ground. The circuit from the control grid is as follows: 46, 50, 49, 3d, 3c, 3b, 3a, 48, 47, 51, 30, ground.

In the "minus" and "zero" positions of switch 24, the movable contacts of switch 23 remain deenergized. In the zero position of 24a, the movable contacts of switch 22 remain deenergized and the electrode is tied through the electrode current sampling resistor to ground. This is true also when the switch 10c is open.

Blocks 4b, 4c, etc. are circuits similar to 4a. The number of such sections is determined by the desired capacity of the test set. The same may be said in general of blocks 3, 5 and 6.

Block 5 shows the adaptor socket for the tube under test. Any combination of connections may be made by use of the terminals indicated. The case illustrated on the schematic is for studies of a pentode tube in rather conventional operation. It will be noted that any tube which has up to four different electrode voltages may be tested in this circuit. This will cover most cases, but the schematic shown is not intended to cover all possible cases. Optional expansions may be made to cover more complicated studies. Connections may be made for testing tubes to cover mixer and converter applications, and for special applications where the plate is used for a shield, the #3 grid as anode, etc.

The filament may be connected for A. C. or D. C. voltage by links 25 and 26. Ground to either side of the filament may be changed from the center tap of the filament transformer 27 by use of the terminals shown. Use of the cathode is dependent on the type of tube.

Block 6 contains the sampling resistors for variable electrode voltages and currents. A small voltage, proportional to electrode current, is developed across current sampling resistor 30, etc.

This current-representing voltage, along with a swinging electrode voltage sample from potential divider 33, is applied to the cathode ray tube circuit (block 8). Similar current sampling resistors may be connected as indicated on the drawing. The voltage developed across these resistors is so small as to have little effect on electrode voltage. Amplifier 39 is then used to provide increased voltage for cathode ray tube 40 deflection plates.

Block 6 also contains the switching devices to accommodate the necessary switching in the easiest manner. The positions of switch 28 (consisting of sections designated 28a, 28b, 28c) denoted as P, $G_1$, $G_2$, and $G_N$ are for connecting the scope circuit (block 8) to the current sampling resistors 30, 32, etc. of the respective electrode circuits. The symbol "$G_N$" is used to denote any electrode.

Sections a, b and c of switch 28 are ganged. Switching provisions for block 6 are as follows:

*Section a.*—Switch section 28a (positions P, $G_1$, $G_2$ and $G_N$, etc.) is used to select the particular electrode current sample to be viewed on the cathode ray tube; said sample to be the voltage developed across sampling resistors 30, 32, etc.

*Section b.*—Switch section 28b (positions P, $G_1$, $G_2$ and $G_N$, etc.) is used to control the shorting relays 29, 31, etc. It has been noted that a small voltage drop is developed across the voltage sampling resistors. This drop affects the electrode voltage depending on the electrode current drawn. Usually, the effect is negligible, but sometimes corrections must be made. In order to limit the number of such corrections to one electrode, all current sampling resistors are shorted (made zero) except the one actually in use.

Relays 29, 31, etc. are normally closed when not excited. Switch section 28b, on position $G_1$, completes the circuit to relay 29 to open the short across resistor 30. Provision is made for similar operation in the other positions.

For low power applications, a special shorting switch section may be used as 28b to eliminate the accompanying shorting relays 29, 31, etc. Connections would be, as before, to short all current sampling resistors to ground, except the one in use.

*Section c.*—Switch section 28c (positions P, $G_1$, $G_2$ and $G_N$, etc.) is to provide a sample of the voltage of the swinging electrode, from potential divider 33, to D. C. amplifier 38. Section 28c has further use in setting up the reference traces for the X and Y axes.

*X and Y axis selection.*—To show the X axis trace, it is necessary to impose a signal of swinging electrode voltage only, to the cathode ray tube X axis circuit. To guarantee that there will be no electrode current signal to cause vertical deflection of the trace, the input of Y axis amplifier 39 is simply grounded. This is accomplished by use of the X axis position of switch 28. At this time, the (—) input of amplifier 39 is grounded via switch 34 and switch section 28a. The sample of swinging electrode voltage is taken from potential divider 33 to switch section 28c to amplifier 38.

Similarly, to show the Y axis trace, it is necessary to impose only a signal of variable current, from any electrode drawing current, to the cathode ray tube Y axis circuit. The input of the X axis amplifier 38 is then grounded. Switch 28 is, at this time, set on the Y axis position. Electrode current is sampled by switch section 28a, and the signal goes to Y axis amplifier 39. Switch section 28b controls the circuit to open the short across current sampling resistor 32. The input of amplifier 38 is grounded via switch section 28c.

The circuit of block 7 is to provide an accurately measured voltage supply for calibrating the Y axis system of block 8, in terms of volts/inch vertical deflection of the cathode ray tube. Conversion is made to a current scale according to the electrode current sampling resistor being used. Switch 34 provides means for switching to the calibration circuit composed of parts 35, 36 and 37, said parts to be internal or external to the test set.

When switch 34 is set to "calibrate," switch 28 must be set in the Y axis position.

Block 8 contains the scope amplifier circuits and the cathode ray tube. The amplifier circuits 38 and 39 are necessarily D. C. amplifiers, and are of a conventional type. Means are provided in the circuits of 38 and 39 for horizontal and vertical positioning of the origin on cathode ray tube 40. Thus the origin on the cathode ray tube may be moved in order to match the origin of the mask graphical background (Figure 2) being used.

Block 9 shows the camera switching mechanism. Solenoid 42 is used to operate the camera shutter on camera 55. Light 45 provides necessary light for photography of the mask, and for the operator when the test set is used in a darkened room.

Switch 41 is installed to protect the camera film in the "camera on" position. During operation of the test set, light 45 is normally off. In the "camera off" position light 45 remains on during operation of the test set, in order to provide light for line-up operations; the camera relay, however, does not operate.

Camera solenoid 42 receives its signal from switch section 10b, when switch 41 is in the "camera on" position. When such signal is received, the arm of solenoid 42 moves down to operate the camera shutter mechanism through spring 43. Spring 43 is to lessen the shock to the camera shutter mechanism from the sudden operation of relay 42. A slight time delay is involved, but this is compensated by adjustment of timing of relay 10.

During the operation of the test set, push button switch 44 is closed only to provide light for photography of the mask. At this time, switch 41 is in the "camera on" position.

The operation of the entire system described in detail above may be briefly recapitulated. A tube to be tested is plugged into the apparatus of block 5. The electrodes of this tube are energized by appropriate D. C. and A. C. power supplies in blocks 2 and 3. The proper polarity is determined by the relays and selector switches of blocks 4a, 4b, and 4c. The currents through the various electrodes normally pass through the resistors 30, 32, etc., to ground for return through the cathode of the tube under test, but there is a voltage drop across any resistor 30, 32, etc. only when the contacts of the associated relay 29, 31, etc. are opened under control of selector switch 28b. The voltage drop across any such resistor which represents the current passed by an electrode under test, is impressed on the oscilloscope while a sample of the test voltage is impressed on other plates of the cathode ray tube. The voltages applied and the recording of the characteristics required are in general effective during a very brief interval determined by rotation of motorized contacts 10. This has the advantage of subjecting the electrodes of the device under test to possibly damaging voltages only for the minimum period of time consistent with the recording requirements; and during this short time interval contacts 10a, which control the general illumination in the room, are open so as to darken the exposed cathode ray tube except for the trace produced by the tube under test.

The test conditions can be altered successively by adjusting the power supplies, and successive characteristics can be displayed on the cathode ray tube. Each characteristic can be photographed while the general illumination of the room is extinguished momentarily. The photographic recording is achieved by the camera shutter operating mechanism under control of shutter-tripping solenoid 42.

In order that the characteristic or multiple characteristics may be provided with a scale of coordinates whose exposure is the same regardless of how many characteristics are separately recorded, a mask is provided (Fig. 2) for mounting in front of a cathode ray tube and for photographic recording in a single separate exposure with front illumination by lamp 45 under control of switch 44.

The foregoing detailed description of a specific embodiment of the invention has been by way of explanation and not by way of limitation.

What I claim is:

1. Apparatus for obtaining characteristic curves of a vacuum tube or the like having several electrodes, comprising power supplies for the several electrodes, one of said power supplies providing a swinging electrode voltage, means for adjusting one of said supplies, a cathode ray tube having a screen, means coupling said cathode ray tube to the vacuum tube or the like to produce successive traces on the screen representing the operation of the vacuum tube or the like during application of swinging voltage, said adjustment means being shifted between traces, electrical shutter opening means for a camera adapted to be focused on said screen, general illuminating means, and a sequencing switch having multiple sets of contacts for causing the various voltages to be applied to the electrode of the vacuum tube, for energizing said shutter-opening means, and for extinguishing the general illumination, whereby successive related curves may be recorded on a single photographic film, a mask having a dark ground and a light data proportioned to overlie the screen of the cathode ray tube, and a supplemental switch for maintaining the general illumination during a cycle of operation of said sequencing switch, whereby coordinate data may be photographically superimposed on a family of photographically recorded traces when said mask is interposed between the camera and the cathode ray screen and illuminated by the general illuminating means.

2. Apparatus for obtaining characteristic curves of a vacuum tube or the like having several electrodes, comprising power supplies for the several electrodes, one of said power supplies providing a swinging electrode voltage, a cathode ray tube having a screen, means coupling said cathode ray tube to the vacuum tube or the like to produce a trace on the screen representing the operation of the vacuum tube or the like during application of the swinging voltage, electrical shutter-opening means, general illuminating means for a camera adapted to be focused on said screen, and a sequencing switch having multiple sets of contacts for causing the various voltages to be applied to the electrodes of the vacuum tube, for energizing the shutter-opening means, and for extinguishing the general illumination, whereby the trace on the screen representing the operation of the vacuum tube or the like may be recorded photographically, a mask having a dark ground and light data proportioned to overlie the screen of the cathode ray tube, and a supplemental switch for maintaining the general illumination during a cycle of operation of said sequencing switch, whereby coordinate data may be photographically superimposed on the photographically recorded trace when said mask is interposed between the camera and the cathode ray screen and illuminated by the general illuminating means.

3. Apparatus for obtaining characteristic curves of a vacuum tube or the like having several electrodes, comprising power supplies for the electrodes, one of said power supplies providing a swinging electrode voltage, means for adjusting at least one of said supplies, a cathode ray tube having a screen, means coupling said cathode ray tube to the vacuum tube or the like to produce successive traces on the screen representing the operation of a vacuum tube or the like during application of the swinging voltage, said adjustment means being shifted between traces, electrical shutter-opening means, general illuminating means for a camera adapted to be focused on said screen, and a sequencing switch having multiple sets of contacts for causing the various voltages to be applied to the electrodes of the vacuum tube, for energizing said shutter-opening means, and for extinguishing the general illumination, whereby successive related curves may be recorded on a single photographic film.

4. Apparatus for obtaining characteristic curves of a vacuum tube or the like having several electrodes, comprising power supplies for the several electrodes, one of said power supplies providing a swinging electrode voltage, means for adjusting at least one of said supplies, a cathode ray tube having a screen, means coupling said cathode ray tube to the vacuum tube or the like to produce successive traces on the screen representing the operation of the vacuum tube or the like during application of the swinging voltage when said adjustment is shifted between traces, electrical shutter-opening means for a camera adapted to be focused on said screen, and a sequencing switch having multiple sets of contacts for causing the various voltages to be applied to the electrodes of the vacuum tube, and for energizing said shutter-opening means, whereby successive related curves may be recorded on a single photographic film and the time of operation of the vacuum tube or the like and of the cathode ray tube may be held to a minimum.

5. Apparatus for obtaining characteristic curves of a vacuum tube or the like having several electrodes, comprising power supplies for the several electrodes, one of said power supplies providing a swinging electrode voltage, a cathode ray tube having a screen, means coupling said cathode ray tube to the vacuum tube or the like to produce a trace on the screen representing the operation of the vacuum tube or the like during application of the swinging voltage, electrical shutter-opening means for a camera adapted to be focused on said screen, and a sequencing switch having contacts for causing various voltages to be applied to the electrodes of the vacuum tube, and for energizing the shutter-opening means, whereby the time interval during which the voltages are applied to the vacuum tube or the like and the operation of the cathode ray tube may be held to a minimum necessary for the required photographic recording.

6. Apparatus for obtaining characteristic curves of a vacuum tube or the like having several electrodes, comprising power supplies for the several electrodes, one of said power supplies providing a swinging electrode voltage, a cathode ray tube having a screen, means coupling said cathode ray tube to the vacuum tube or the like to produce a trace representing the operation of the vacuum tube or the like during application of the swinging voltage, and a sequencing switch having multiple sets of contacts causing the various voltages to be applied to the electrodes of the vacuum tube during a minimum time consistent with the required display of the characteristic trace.

7. The method of producing the characteristic curves of a vacuum tube or the like which comprises concurrently subjecting the electrodes of the vacuum tube to appropriate static and varying voltages, displaying the characteristic variations on a cathode ray tube, successively photographing the traces displayed on the cathode ray tube with successively different voltages on the vacuum tube, the cathode-ray screen being maintained in darkness except for the traces during these photographic exposures, applying a dark mask having light graph inscriptions to the face of the cathode ray tube in predetermined registry with the photographic traces produced, and simultaneously illuminating the mask and photographing it, to yield a family of curves on a common set of graph coordinates.

8. The method of producing a curve characteristic of a vacuum tube or the like comprising the steps of applying appropriate static and varying voltages to said tube, displaying the characteristic variations of the tube on the screen of a cathode ray tube, photographically recording the trace on the screen of a cathode ray tube which is otherwise confined to darkness, applying a mask to the face of the screen having a dark ground and light graph inscriptions, illuminating said mask, and photographically superimposing said graph inscription on the photographically recorded trace.

JAMES G. MILES.

REFERENCES CITED

The following references are of record in the file of this patent:

UNITED STATES PATENTS

| Number | Name | Date |
|---|---|---|
| 2,186,268 | Palala | Jan. 9, 1940 |
| 2,412,231 | Sharkey | Dec. 10, 1946 |
| 2,443,794 | MacNichol, Jr. | June 22, 1948 |
| 2,487,599 | Schell | Nov. 8, 1949 |